United States Patent Office 3,464,939
Patented Sept. 2, 1969

3,464,939
PROCESS FOR PREPARING WATER-SOLUBLE
EPOXY RESIN ESTERS
William J. van Westrenen, Delft, Netherlands, assignor to Shell Oil Company, New York, N.Y., a corporation of Delaware
No Drawing. Filed Feb. 20, 1967, Ser. No. 617,068
Claims priority, application Netherlands, Feb. 22, 1966, 6602242
Int. Cl. C08g 30/04
U.S. Cl. 260—22
10 Claims

ABSTRACT OF THE DISCLOSURE

Water-soluble epoxy resin esters which are useful as binders and primers are prepared (1) by reacting an epoxy resin with an alpha-branched, saturated, aliphatic, monocarboxylic acid, (2) esterifying this intermediate with ethylenically unsaturated fatty acids, (3) reacting this ester with an ethylenically unsaturated polycarboxylic acid or anhydride such as maleic anhydride, and (4) neutralizing the resulting product with a nitrogen-containing base.

---

This invention relates to a process for the preparation of water-soluble epoxy resin esters. More particularly, the invention provides a process for preparing water-thinnable epoxy resin ester paint binders.

Specifically, the invention provides a process for preparing water-soluble epoxy resin esters which comprises (1) reacting a polyglycidyl ether of a polyhydric alcohol or polyhydric phenol with from 0.5 to 1 equivalent of an alpha-branched, saturated, aliphatic monocarboxylic acid per epoxy equivalent, (2) esterifying this intermediate with unsaturated fatty acids, (3) reacting the resulting ester with an ethylenically unsaturated polycarboxylic acid or anhydride, preferably maleic anhydride, to introduce free carboxyl groups, then (4) solubilizing the resulting product by neutralization with a nitrogen base such as ammonia or an amine. The resulting esters are water-soluble or water-thinnable.

The use of water instead of an organic solvent as paint thinner offers several important advantages, for example, water is cheap, nonflammable and nontoxic. Further, the paint components from the aqueous solution or suspension can be effectively and efficiently deposited on metals by electrodeposition to form a pore-free coating, at a relatively thin layer thickness, especially in places where it is difficult or impossible to reach and coat by conventional techniques such as spraying, dipping or brushing.

Water-thinnable binders have been prepared before by completely esterifying certain polyepoxides with linseed oil fatty acids, followed by reaction with maleic anhydride and subsequent neutralization with ammonia. These paint binders, however, have several disadvantages, notably low pH-stability and unsatisfactory flow properties. With a low pH-stability, the pH decreases significantly upon storage which detrimentally affects the thinnability with water and the dispersability of pigments. When the flow properties are unsatisfactory, the appearance of the resulting paint coating upon drying after application as by spraying is generally irregular, i.e., "orange peel" or wrinkling.

The principal object of the present invention is to provide water-soluble or water-thinnable paint binders having improved pH-stability and excellent flow properties. It is a further object to provide water-thinnable polyepoxide paint binders which when applied to surfaces, produce coatings which exhibit excellent mechanical properties and chemical resistance. These and other objects will become apparent to one skilled in the art from the following disclosure.

Novel condensation products which are thinnable in water and which exhibit the above-noted improved properties are prepared by reacting a polyepoxide, preferably a polyglycidyl ether of a polyhydric phenol, with a saturated, aliphatic monocarboxylic acid in which the carboxyl groups are bound to tertiary and/or quaternary carbon atoms in an amount of 0.5 to 1.0 acid equivalent of monocarboxylic acid per epoxy equivalent, then esterifying this hydroxyl-containing ester with ethylenically unsaturated fatty acids in an amount not exceeding one acid equivalent per hydroxy equivalent. The resulting polyester is then reacted with at least 4% by weight, based on the polyester, of an ethylenically unsaturated polycarboxylic acid or anhydride, and preferably maleic anhydride. The resulting resin is then solubilized by reaction with a nitrogen-containing base such as an amine.

The polyepoxide materials which may be used in preparing the point binders of the present invention comprise those organic materials which have more than one vic-epoxy group, i.e., more than one

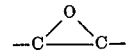

group, which group may be in a

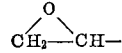

group, or in an internal position, i.e., a

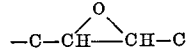

The polyepoxide may be saturated or unsaturated, aliphatic, cycloaliphatic, aromatic or heterocyclic and may be substituted with substituents such as chlorine, hydroxyl groups, ether radicals, and the like.

Examples of such polyepoxides include, among others 1,4 - bis(2,3 - epoxypropoxy)benzene, 1,3-bis(2,3-epoxypropoxy)benzene, 4,4' - bis(2,3 - epoxypropoxy)octane, 1,4 - bis(2,3 - epoxypropoxy)cyclohexane, 4,4'-bis(2-hydroxy-3,4'-epoxybutoxy)diphenyl dimethylmethane, 1,3 bis(4,5 - epoxypentoxy) - 5 - chlorobenzene, 1,4-bis(3,4-epoxybutoxy) - 2-chloroxyclohexane, 1,3-bis(2-hydroxy-3,4 - epoxybutoxy)benzene, 1,4-bis(2-hydroxy-4,5-epoxypentoxy)benzene.

Other examples include the epoxy polyethers of polyhydric phenols obtained by reacting the polyhydric phenol with a halogen-containing epoxide or dihalohydrin in the presence of an alkaline medium. Polyhydric phenols that can be used for this purpose include among others, resorcinol, catechol, hydroquinone, methyl resorcinol, or polynuclear phenols, such as 2,2-bis(4-hydroxyphenyl)propane (Bisphenol A), 2,2-bis(4-hydroxyphenyl)butane, 4,4' - dihydroxybenzophenone, bis(4-hydroxyphenyl)ethane, 2,2 - bis(4-hydroxyphenyl)pentane 1,1,2,2 - tetrakis(4-hydroxyphenyl)ethane, 1,5-dihydroxynaphthalene, and that class of phenol-formaldehyde resins known as the Novolacs. The halogen-containing epoxides may be further exemplified by 3-chloro-1,2-epoxybutane, 3 - bromo - 1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportion of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

Very suitable polyglycidyl ethers of 2,2-bis(4-hydroxyphenyl)propane may be represented by the general formula:

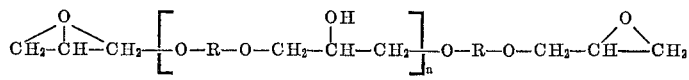

in which R represents the divalent group

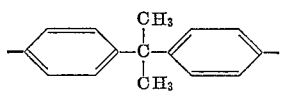

and $n$ has an average value of from about 0 to about 12. During the preparation some of the terminal glycidyl groups may be hydrated to

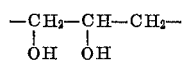

groups by reaction with water.

Preference is given a polyglycidyl polyethers of 2,2-bis(4-hydroxyphenyl)propane having a molecular weight of 3400–1000 and an epoxy equivalency of 170–600. Particularly preferred are polyglycidyl ethers of 2,2-bis(4-hydroxyphenyl)propane having a molecular weight of 700–1000 and an epoxy equivalent weight of 400–600, in view of the most favorable ratio between epoxy groups and free hydroxyl groups.

The preparation of four suitable glycidyl polyethers of dihydric phenols is illustrated in U.S. 2,633,458 and are designated polyethers A, B, C, and D. Other suitable polyepoxides comprise the polyether F disclosed in U.S. 2,633,458. Other very suitable polyepoxides are disclosed in U.S. 2,633,458.

For the sake of brevity, the saturated aliphatic monocarboxylic acids whose carboxyl group is attached to a tertiary or quaternary carbon atom will usually, in this specification, be referred to as branched or alpha-branched monocarboxylic acids.

Suitable alpha-branched saturated monocarboxylic acids are obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are sometimes called Koch acids in the art ("Carbonsaure-Synthese aus Olefinen, Kohlenoxyd und Wasser," Koch, Brennstoff-Chemie, November 1955, pages 321–328). Monocarboxylic acids branched at the alpha position can also be obtained according to Reppe's method. Of special value are the acids from monoolefins containing 3 to 18 carbon atoms. Mixtures of olefins obtained by cracking paraffinic hydrocarbons, such as petroleum fractions, are preferably used as starting material. These mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

Preferably, these acids are obtained by reacting with carbon monoxide and water, olefins having at least 3 carbon atoms in the molecule. This reaction takes place under the influence of acid catalysts, for example, phosphoric acid, sulfuric acid and complexes of phosphoric acid with boron fluoride. The reaction is more thoroughly described in U.S. 3,059,004, issued Oct. 16, 1962. As indicated in this patent, the carboxyl group adds on at the double bond and even when the double bond is terminal, the addition is such a strong tendency for tertiary groups to be formed by isomerization. Branching at the double bond also provides a tertiary carboxyl group. Very attractive products are obtained when monoolefins having at least 8 and not more than 18 carbon atoms in the molecule are thus converted into monocarboxylic acids. Preferably, more than 10% of the monocarboxylic acids will be tertiary in the carboxyl group.

Preferred saturated aliphatic monocarboxylic acids which may be used in the present process have the general formula:

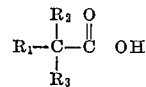

wherein $R_1$ and $R_2$ are the same or different alkyl radicals, $R_3$ is an alkyl radical or hydrogen, and $R_1+R_2+R_3$ contain from 2 to 17 carbon atoms. Expressed another way, preferred alpha-branched monocarboxylic acids contain a total of 4 to 19 carbon atoms. Particularly preferred monocarboxylic acids contain from 9 to 19 carbon atoms with 9 to 11 being especially preferred.

The alpha-branched monocarboxylic acids are converted with the polyglycidyl ethers in amounts of 0.5 to 1.0 acid equivalent per epoxy equivalent. A quantity of 0.8–1.0 acid equivalent of alpha-branched monocarboxylic acids per epoxy equivalent of polyepoxide is preferred. The reaction is carried out at elevated temperatures, and preferably at temperatures between 150° and 250° C. The alpha-branched monocarboxylic acids then react principally with the epoxy groups of the polyepoxide by an addition reaction which may be represented by the general formula:

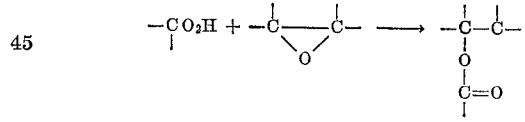

Reaction of the branched monocarboxylic acids with hydroxyl groups of the polyepoxide or of the above primary reaction products may also take place, but is generally of minor importance because of the greater reactivity of epoxy groups and of the selected ratios of reactants.

The reaction may be considered as completed when there is no further decrease in the acid number. To avoid unexpectedly violent reactions the ester is preferably cooled before the ethylenically unsaturated fatty acid is added.

The ethylenically unsaturated fatty acids containing from about 10 to 24 carbon atoms are then added in amounts of from 0.1 to 1.0 acid equivalent per hydroxy equivalent. The number of hydroxy equivalents in the reaction mixture is found by deducting the number of acid equivalents of alpha-branched monocarboxylic acids from the number of potential hydroxy equivalents of the quantity of polyglycidyl polyether used. The number of potential hydroxy equivalents of the polyglycidyl polyether is calculated by dividing the actual weight by the esterification value. It is apparent that the potential hydroxy groups are the hydroxy groups present plus the epoxy groups, each epoxy group being counted as two hydroxy groups.

Preference is given to ethylenically unsaturated fatty acids containing more than one ethylenic group per molecule and from 16 to 20 carbon atoms. Examples are fatty acids from drying oils, such as linseed oil, tung oil, soybean oil, fish oil, cotton seed oil, oiticica oil, perilla oil, sunflower seed oil. Dehydrated drying oils such as dehydrated fatty acids from castor oil and tall oil fatty acids may also be used.

Both the conversion of the polglycidyl polyethers with alpha-branched monocarboxylic acids and the esterification with fatty acids can be carried out, if desired, in the presence of catalysts such as sodium carbonate, calcium oxide, zinc oxide, stannous oxide, calcium naphthenate, zinc naphthenate, stannous octoate and triphenyl phosphine or mixtures thereof.

The esterification is carried out at elevated temperature, preferably at temperatures of 200–260° C. During esterification water is formed by reaction of carboxyl groups of the fatty acid with hydroxyl groups of the hydroxy ester. This water is removed by evaporation, as for example, by azeotropic distillation with a few percent by weight of xylene, for example, 3% by weight, based on the total weight of reactants, with the water being separated from the xylene in a water trap after cooling. The esterification reaction is completed when further decrease in the acid number of the mixture becomes negligible; this is usually after 6–8 hours at reaction temperatures of 240°–260° C. When the heating periods are longer, the viscosity often rises to an undesirable extent without any further decrease in the acid number.

The polyester is preferably cooled before the addition of the ethylenically unsaturated polycarboxylic acid or polycarboxylic anhydride, for example to 100–140° C.

Suitable ethylenically unsaturated polycarboxylic acids and anhydrides include, among others, fumaric acid, fumaric anhydride, maleic acid, maleic anhydride, citraconic acid, citraconic anhydride, mesaconic acid and mesaconic anhydride. Maleic acid is preferred with maleic anhydride being especially preferred. The ethylenically unsaturated polycarboxylic acid or its anhydride reacts with the completely esterified polyether mainly by addition reactions with the hydrocarbon radical of the unsaturated fatty acid groups. The reaction temperature is preferably above 175° C., for instance 210–250° C. With higher reaction temperatures, such as 230–250° C., the viscosity may rise considerably when using large quantities of maleic anhydride, while longer reaction times may result in gelling. The maintaining of low reaction temperatures, such as 200–210° C., is favorable for obtaining low-viscosity products. In general, the reaction time is from 20 minutes to more than 1 hour. It is advisable to control the course of reaction by measuring the viscosity. The quantity of unsaturated polycarboxylic acid or its anhydride employed is generally above 4% by weight, based on the weight of the polyester, and is preferably between about 4% and 20%. Maleic anhydride is preferably used in quantities of from 4% to 10% by weight.

The range of reactions of the polyglycidyl polyether with alpha-branched monocarboxylic acids, with unsaturated fatty acids and with the ethylencal unsaturated polycarboxylic acid or anhydride is preferably carried out in an inert, oxygen-free atmosphere, as, for example, by passing nitrogen through or over the reaction mixture.

The reaction product, which contains free carboxyl groups, is cooled and can immediately be neutralized or can be stored and transported as such. As the neutralization agent, a nitrogen base is preferred, such as ammonia or a primary, secondary or tertiary aliphatic or cycloaliphatic amine, for example triethylamine, betadimethyl aminoethanol, monoethanolamine, diethanolamine, triethanolamine, monoisopropanolamine, diisopropanolamine, cyclohexylamine, morpholine, piperidine and piperazine. The quantity of neutralization agent is selected in such a way, that at least 50% of the carboxyl groups are neutralized. The pH of the neutralized binder depends on the degree of neutralization. If all the carboxyl groups are neutralized the pH is higher than when only 70% or 50% of the carboxyl groups are neutralized. Complete neutralization usually gives products which dissolve in water completely without any haziness; in the case of partial neutralization the solutions in water are often somewhat hazy. The adjustment to a certain pH by means of partial neutralization may be desired in view of the dispersion of pigments.

A lyotropic solvent, such as an ethylene glycol monoalkyl ether such as ethylene glycol monobutyl ether, is preferably added to promote the clear solubility in water. Such lyotropic solvents are preferably used in quantities up to 50% by weight, based on the weight of the carboxyl-containing condensation product. In view of the rather high viscosities of the condensation products, it is advisable to add a portion of the solvent, for example, 10 parts by weight of lyotropic solvent per 100 parts by weight of condensation product, during the cooling of the reaction product, another amount after cooling and then to add the neutralization agent.

The completely or partially neutralized products may be stored, and if desired thinned with water, for a long time without substantial decrease in pH and without precipitation or phase separation taking place.

The solutions of the completely or partially neutralized products may be processed with many pigments to paints in the conventional way, as for example, by mixing in a ball mill, on a paint roller mill, etc. Driers may then be added in conventional quantities. As driers, cobalt naphthenates and octoates are preferably used, for instance in quantities up to 0.04% by weight of Co, based on the weight of the binder. Other naphthenates and octoates, such as those of zinc, calcium, magnese and lead may also be used. If desired, other water-thinnable binders, such as urea-formaldehyde resins and melamine-formaldehyde resins, may also be added.

Paints and varnishes containing the present binders may be applied to articles in the usual way, such as by brush, roller or spraying. They may also be deposited on metals by electrodeposition from a solution or dispersion, the metal to be coated serving as the anode. The coat applied is hardened in a short time, preferably by accelerated drying at elevated temperature, such as 100–150° C.

In order to illustrate the invention more fully some specific examples are given. The reactants, their proportions and other specific ingredients are presented as being typical and various modifications can be made in view of the foregoing disclosure and discussion without departing from the spirit or scope of the specification or of the claims. Unless otherwise stated, parts and percentages are by weight.

The alpha-branched, saturated, aliphatic monocarboxylic acids used in the following examples contained from 9 to 11 carbon atoms and were obtained from alkenes containing from 8 to 10 carbon atoms obtained as a fraction of a product formed in the thermal vapor-phase cracking of a paraffinic feedstock in the presence of steam. The dienes originally present in this fraction were converted to monoolefins by partial hydrogenation. The alkenes were substantially unbranched and the double bonds were present almost exclusively between nonterminal carbon atoms.

The alkenes ($C_8$–$C_{10}$) were then converted to alpha-branched, saturated, aliphatic monocarboxylic acids containing 9 to 11 carbon atoms by reacting the alkenes with carbon monoxide and water at 60° C. and 100 atmospheres pressures in the presence of a catalyst consisting of an equimolar mixture of $H_3PO_4$ and $BF_3$, and water.

The Erichsen penetration was determined by slowly pressing a metal ball into the back of the steel test panel, which had been coated with a coat of paint and which was supported around the point of contact by a ring, and ascertaining how many mm. this ball could be pressed into the panel until the coat of paint cracked.

In the evaluating, the resistance to chemicals (salt spray, moisture, distilled water, NaOH), the rating 0 indicates complete destruction of the coat and the rating 10, no damage.

The resistance to salt spray and moisture was determined in accordance with British Defense Specification DEF 1053.

EXAMPLE I

This example describes the preparation of the water-thinnable binder of the present invention, and the stability of the binders.

The following raw materials were used:

| | G. |
|---|---|
| Polyglycidyl polyether of 2,2-bis(4-hydroxyphenyl)propane containing 0.212 epoxy equivalent/100 g. and 0.685 esterification equivalent/100 g. | 1300 |
| Alpha-branched monocarboxylic acids ($C_9$–$C_{11}$) (2.45 acid equivalents) | 450 |
| Linseed oil fatty acids (6.455 acid equivalents) | 1804 |
| Maleic anhydride | 188.5 |

In a four-necked flask provided with stirrer, thermometer, gas inlet tube, reflux condenser with water trap and heating jacket, the above quantities of polyglycidyl polyether and alpha-branched monocarboxylic acids were heated to 225° for 6 hours with stirring under a nitrogen atmosphere. The acid number was 7.3 mg. KOH/g. After cooling to 100° C., the linseed oil fatty acid was added. The mixture was kept at 240° C. until there was no further decrease in the acid number. After 8 hours, the acid number was 33 mg. KOH/g., and during this time 95 g. of water formed during the esterification was collected.

After cooling to 120° C. the maleic anhydride was added and the mixture was heated to 230° C. and maintained at this temperature for 45 minutes. The acid number was then 58 mg. KOH/g., and the viscosity was 122 poises, measured at 50° C.

The resin was cooled to 200° C., and after the addition of 10 parts by weight of ethylene glycol monobutyl ether per 100 g. of resin, it was further cooled down to room temperature. A quantity of 55 g. of this solution was diluted with 13.8 g. of ethylene glycol monobutyl ether and neutralized with 5.23 g. (theoretical quantity of triethylamine).

It was possible to dilute the neutralized resin solution with demineralized water in any ratio without any precipitation or phase separation taking place. After dilution with water to a solid-matter content of 30% and storage at 25° and 40° C. the pH was as follows:

| | Beginning | 1 month | 6 months |
|---|---|---|---|
| 25° C | 9.8 | 9.8 | 9.4 |
| 40° C | 9.8 | 9.7 | 8.5 |

EXAMPLE II

This example illustrates the preparation of the surface coating binders of the instant invention and the primers prepared therefrom. A comparison is made with other binders.

A mixture of the following components was ground in a ball mill for 24 hours:

| | G. |
|---|---|
| Synthetic red iron oxide | 100 |
| Blanc fixe (barium sulfate pigment) | 71 |
| Lead silicochromate | 15 |
| Diatomaceous earth | 4 |
| Micro talc | 10 |
| A nuetralized resin solution prepared by the process of Example I, thinned with water to a solid-matter content of 25% by weight | 332.4 | and cobalt and zinc naphthenate in a quantity corresponding to 0.02% of Co and 0.06% of Zn, based on the weight of the solid matter of the resin solution.

By way of comparison, steel panels were treated with a corresponding primer which contained a "D-4 ester" as the binder. The D-4 ester was prepared according to standard directions (see Epon Resin Esters for Surface Coatings, Shell Chemical Company, Technical Publication SC: 60–63), by esterifying 60 parts by weight of Epon 1004 (a polyglycidyl-polyether of 2,2-bis(4-hydroxyphenyl)propane having an epoxy equivalent weight of 900–1000 and an average molecular weight of 1400) with 40 parts by weight of dehydrated castor oil fatty acids by heating at 240° C. for 3–5 hours, the water formed being continuously removed by azeotropic distillation with xylene. The D-4 ester is not thinnable with water, so xylene was used.

The coats of paint were examined both as such and after the application of a white pigmented finishing coat, viz., a stoving enamel consisting of 70 parts by weight of an alkyd resin from phthalic anhydride, glycerol, and glycidyl esters of saturated aliphatic monocarboxylic acids, in which the carboxyl groups were bound to teritary and quaternary carbon atoms, 30 parts by weight of melmine-formaldehyde resin and 90 parts by weight of titanium white, and stoved for 40 minutes at 150° C.

The results are summarized in Table I.

TABLE I

| | Primer based on the instant water-soluble binder | | Primer based on D-4 ester (water-insoluble) | |
|---|---|---|---|---|
| | Without finishing coat | With finishing coat | Without finishing coat | With finishing coat |
| Coat thickness (μ) | 30 | 62 | 30 | 70 |
| Erichsen penetration (mm.) | 8.0 | 4.4 | 8.0 | 5.8 |
| Erichsen reverse impact strength (mm.) | 4½ | | 4.0 | |
| Salt spray (DEF 1053) condition of paint (500 hours) | 8 | | 6 | |
| Condition of substrate (500 hours) | 9 | | 8 | |
| Condition of paint (1,000 hours) | | 7 | | 5 |
| Condition of substrate (1,000 hours) | | 9 | | 7 |
| Resistance to humidity (DEF 1053; 1,000 hours) | 9 | 7 | 9½ | 5 |
| Distilled water (1,000 hours) | 10 | 10 | 9 | 9 |
| Resistance to NaOH (5% by weight, 1 day, 25° C.) | 3 | | 3 | |

EXAMPLE III

This example describes the preparation of the water-thinnable binders of the present invention.

| | G. |
|---|---|
| Polyglycidyl polyether as in Example I (3.125 epoxy equivalents) | 1450 |
| Alpha-branched monocarboxylic acids ($C_9$–$C_{11}$) (3.125 acid equivalents) | 572 |
| Linseed oil fatty acids (6.875 acid equivalents) | 1925 |
| Catalyst 0.290 g. of $Na_2CO_3 \cdot 10H_2O$ + 0.218 g. SnO. | |

In the same equipment as used in Example I, the above quantities of polyglycidyl ether and alpha-branched monocarboxylic acids were reacted after addition of the catalyst. The temperature was 240° C. After 220 minutes the acid number was 4 mg. KOH/g. The linseed oil fatty acid was added after the reaction mixture had been cooled to 120° C. The temperature was then raised to 240° C. and maintained at that level. After 6½ hours, the acid number was 22.9 mg. KOH/g.

52.1 grams of maleic anhydride were added to 800 g. of this polyester at a temperature of 120° C. The mixture was kept at 230° C. for 45 minutes; the viscosity was then 664 poises, measured at 50° C., and the acid number 70 mg. KOH/g.

After the mixture had been thinned with ethylene glycol monobutyl ether in the same way as in Example I, the following substances were added to portions of the resin:

(A) Triethylamine in a quantity sufficient to neutralize 50% of the carboxyl groups.
(B) Triethylamine in a quantity sufficient to neutralize the carboxyl groups completely.
(C) Diisopropanolamine in a quantity sufficient to neutralize 50% of the carboxyl groups.
(D) Diisopropanolamine in a quantity sufficient to neutralize the carboxyl groups completely.

It was possible to thin the solutions B and D with water in any ratio without any haziness or precipitation.

The solutions A and C, thinned with water to a solid-matter content of 10% by weight, were somewhat hazy; however, after having been stored for 6 months at 23° C. the solutions did not show any trace of phase separation.

Solution C, thinned with water to 10% by weight of solid matter, was used to precipitate a layer of resin electrophoretically from the solution onto a metal panel. Using a constant voltage difference of 80 volts at an electrode distance of 15 cm., a 20-micron resin film was deposited in 2 minutes. After stoving for 30 minutes at 150° C. this film was homogeneous, tough, and had excellent adherence.

EXAMPLE IV

Using the same quantities of base materials as in Example III, but with a catalyst consisting of 3.7 g. of triphenyl-phosphine+0.78 g. of $Na_2CO_3 \cdot 10H_2O$, the conversion of the polyglycidyl polyether and the alpha-branched monocarboxylic acids took place at 170° C. in 60 minutes, the acid number of the reaction product being 5.5 mg. KOH/g. After addition of the linseed oil fatty acid, the temperature was maintained at 240° C.; after 6½ hours the acid number was 21.1 mg. KOH/g.; 100 g. of water were collected in the water trap.

Quantities of maleic anhydride were added to 800 g. portions of this polyester as indicated in the following Table II. The mixture was then held at 210° C. After the reaction times given in Table II, the viscosity of the reaction product was determined. The reaction was stopped when the viscosity was higher than 100 poises at 50° C.

TABLE II

| Resin Product | Quantity of maleic anhydride (g.) | Viscosity in poises at 50° C. after reaction at 210° C. for— | | | | | Acid number of the final product |
|---|---|---|---|---|---|---|---|
| | | 0 min. | 15 min. | 30 min. | 50 min. | 73 min. | |
| E | 40.0 | 19 | 37 | 60 | 92 | 128 | 54.6 |
| F | 52.1 | 18 | 44 | 88 | 182 | | 70.0 |
| G | 63.7 | 20 | 60 | 158 | | | 85.0 |
| H | 76.5 | 18 | 74 | ¹114 | | | 100.0 |

¹ 20 min.

The reaction products were thinned with ethylene glycol monobutyl ether as described in Example I, and neutralized with diisopropanolamine. The neutralized products F, G and H were completely soluble in water in all ratios and the neutralized product E was emulsifiable in water.

10% by weight solutions in water of completely and partially neutralized reaction products F, G and H had the properties in Table III.

I claim as my invention:

1. A process for preparing water-thinnable epoxy resin esters which comprises:
   (1) reacting a polyglycidyl ether of a polyhydric compound selected from the group consisting of polyhydric alcohols and polyhydric phenols with from 0.5 to 1 equivalent per epoxy equivalent of an alpha-branched, saturated, aliphatic monocarboxylic acid containing from 9 to 19 carbon atoms,
   (2) esterifying this intermediate resin with ethylenically unsaturated fatty acids containing from 10 to 24 carbon atoms, said fatty acids being used in amounts to provide from 0.1 to 1.0 acid equivalent per hydroxy equivalent,
   (3) reacting the resulting esters with from about 4% to about 20% by weight of an ethylenically unsaturated polycarboxylic compound selected from the group consisting of polycarboxylic acids and polycarboxylic acid anhydrides, and
   (4) solubilizing the resulting product by neutralizing at least 50% of the carboxyl groups with a nitrogen-containing base.

2. A process as in claim 1 wherein the polyglycidyl ether is a polyglycidyl polyester of 2,2 - bis(4-hydroxyphenyl)propane.

3. A process as in claim 2 wherein the polyglycidyl polyether of 2,2-bis(4-hydroxyphenyl)propane has a molecular weight of 340 to 1000 and an epoxy equivalent weight of 170 to 600.

4. A process as in claim 1 wherein the alpha-branched monocarboxylic acids contain from 9 to 11 carbon atoms.

5. A process as in claim 1 wherein the ethylenically unsaturated fatty acids contain more than one ethylenic group per molecule and contain from 16 to 20 carbon atoms.

6. A process as in claim 1 wherein the ethylenically unsaturated fatty acids are linseed oil fatty acids.

7. A process as in claim 1 wherein the ethylenically unsaturated polycarboxylic compound is maleic anhydride.

8. A process as in claim 1 wherein the nitrogen base is selected from the group consisting of primary, secondary and tertiary aliphatic amines and cycloaliphatic amines.

9. A process as in claim 1 wherein up to 50% by weight of a lyotropically active substance is additionally added to the composition.

10. A water-thinnable epoxy resin ester prepared by the process of claim 1.

TABLE III

| Degree of neutralization | 0.5 eq. | | | 1.0 eq. | | | 0.5 eq. | | | 1.0 eq. | | |
|---|---|---|---|---|---|---|---|---|---|---|---|---|
| Neutralization agent | Triethyl amine | | | Triethyl amine | | | Diisopropanol amine | | | Diisopropanol amine | | |
| Property | pH | R | A | pH | R | A | pH | R | A | pH | R | A |
| Resin Product F | 8.0 | 770 | S | 10.1 | 590 | M-S | 8.0 | 940 | M-S | 9.0 | 860 | C |
| Resin Product G | 8.0 | 610 | M | 10.4 | 450 | C | 7.9 | 790 | M | 9.1 | 740 | C |
| Resin Product H | 8.0 | 460 | M | 10.3 | 360 | C | 7.8 | 620 | M-S | 9.0 | 600 | C |

Eq. is a gram-equivalent of amine per gram-equivalent of acid; R is the specific resistance in ohm cm.; A is the appearance of the solution; S is severe haze; M is moderate haze; C is clear.

(References on following page)

References Cited

UNITED STATES PATENTS

| | | | |
|---|---|---|---|
| 3,268,483 | 8/1966 | Klootwijk et al. | 260—22 |
| 3,277,035 | 10/1966 | Vegter et al. | 260—22 |
| 3,293,201 | 12/1966 | Shahade et al. | 260—23 |
| 3,332,898 | 7/1967 | Kloos | 260—23 |

FOREIGN PATENTS

| | | |
|---|---|---|
| 2,631,135 | 5/1963 | Australia. |
| 738,045 | 7/1966 | Canada. |
| 858,827 | 1/1961 | Great Britain. |

DONALD E. CZAJA, Primary Examiner

R. W. GRIFFIN, Assistant Examiner

U.S. Cl. X.R.

204—181; 117—134, 167; 260—39, 40, 29.2, 31.4, 33.2, 18, 21, 32.4, 32.6